Patented June 2, 1942

2,284,962

UNITED STATES PATENT OFFICE 2,284,962

CELLULOSE DERIVATIVES CONTAINING SULPHUR AND NITROGEN AND PROCESS OF MAKING SAME

Robert Haller, Riehen, and Alphonse Heckendorn, Basel, Switzerland, assignors to Society of Chemical Industry in Basle, Basel, Switzerland No Drawing. Application December 22, 1939, Serial No. 310,628. In Switzerland November 9, 1938

16 Claims. (Cl. 260—218)

Various processes are known for producing cellulose fibres containing sulphur and nitrogen and adapted for being dyed with acid dyestuffs. All these processes start from cellulose xanthates which are unstable to water, either cellulose xanthate fibres or cellulose xanthate solutions being used. The cellulose xanthate fibres are converted into final products stable to water, for example by treatment during or after their production with a halogen alkylamine or by an oxidising treatment followed by a treatment with an aliphatic diamine. When starting from solutions of cellulose xanthate the cellulose derivatives stable to water are obtained either by causing the solution first to react with a halogen alkylamine and then coagulating it or by first coagulating for example by introduction into a bath of an ammonium salt and then treating the coagulate with ethylene imine or a homologue thereof.

This invention relates to a manufacture of cellulose derivatives containing sulphur and nitrogen and having an excellent affinity for acid dyestuffs and substantive dyestuffs by treating with an halogenating agent, a cellulose xanthate in solid form made from alkali cellulose and carbon bisulphide in the usual manner in the presence of an aqueous solution of a nitrogenous compound of the general formula

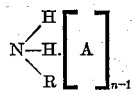

in which R is a member of the group consisting of a hydrogen atom and an alkyl residue, the term alkyl including also a substituted alkyl residue, A stands for an acid capable of forming a salt with

and $n$ is an integer not greater than 2.

The process may be so conducted that the structure of the parent material is maintained or so that the structure is not maintained. When the structure is to be preserved and the parent material is for example a cotton yarn, the final product is also a cotton yarn which does not differ externally from the parent material. If the structure is not to be maintained during the operation a cellulose xanthate solution may be used which can be worked up into any desired form, for example artificial silk, staple fibres, films, sheets or the like.

That this process of working characterised by simplicity and cheapness should yield cellulose derivatives containing sulphur and nitrogen must be considered very surprising.

For making the necessary cellulose xanthate there may be used as parent material quite generally both natural and artificial cellulose materials or materials containing cellulose, for instance natural cellulose fibres, especially cotton, linters, wood pulp, materials consisting of regenerated cellulose, for instance viscose and especially waste derived from the production of regenerated cellulose or the industries that work up such cellulose.

As a nitrogenous compound for use in the treatment there may be used an inorganic or organic compound; suitable inorganic compounds are ammonia or ammonium salts of inorganic acids, especially ammonium chloride, sulphate, nitrate or phosphate, ammonium sulphate and ammonium chloride giving the best results; suitable organic compounds are ammonium salts of organic acids, for instance ammonium formate, acetate, tartrate, citrate, benzoate or the like, primary aliphatic amines as such or in the form of their salts, R in the above formula being an alkyl group such as $CH_3, C_2H_5$ or the like, for instance methylamine, ethylamine or the like or their salts, and also primary aliphatic amines substituted in the alkyl group either in the free form or in the form of their salts, R in the above formula standing for $NH_2CH_2CH_2$, $C_2H_5NHCH_2CH_2$, $(C_2H_5)_2NCH_2CH_2$
$OHCH_2CH_2$, $C_2H_5OCH_2CH_2$, $C_6H_5CH_2$ or the like, for instance ethylenediamine, monoethylethylenediamine, unsymmetrical diethylethylenediamine, oxyethylamine, ethoxyethylamine, benzylamine or the like or salts thereof.

For the halogenating treatment there may be used various halogenating agents; especially suitable are salts of hypochlorous acid or substances which tend to produce such salts in alkaline solutions, for instance the hypochlorites of alkalis and alkaline earths, for example sodium hypochlorite, calcium hypochlorite, also the sodium salt of para-toluene sulphonic acid chloramide, paratoluene sulphonic acid dichloramide, chlorine or the like.

The treatment of the cellulose xanthate with an aqueous solution of the compound containing nitrogen is conducted preferably at a temperature between 40 and 60° C. and the treatment with the halogenating agent at room temperature. If both treatments are to occur simultaneously, it is an advantage to operate at room temperature.

If cellulose xanthate solutions are used which are to be spun or otherwise shaped it is necessary first to coagulate the solution by introduction into a precipitating bath consisting of a salt solution. If a solution of an ammonium salt is selected the treatment with the halogenating agent may follow directly after the coagulation; thus coagulation and the treatment according to the invention with the aqueous solution of a compound containing nitrogen take place simultaneously. On the other hand if a solution which is not that of an ammonium salt is selected as the precipitating bath, for instance a solution of sodium sulphate or sodium chloride, there must be inserted before the treatment with the halogenating agent a treatment with the aqueous solution containing the nitrogen compound. It is always an advantage to add to the precipitating bath an acid, for instance sulphuric acid or acetic acid which accelerates the formation of the coagulate, for then a more rapid spinning is possible.

Furthermore it is preferable in any case to pass the final product through a bath containing sodium bisulphite or an acid for the purpose of removing the last traces of halogen which may be present.

The new cellulose derivatives have an excellent affinity for acid and substantive dyestuffs. They are stable even towards hot dilute solutions of acids while to dilute alkalis, for instance caustic soda solution, they are stable only in the cold and towards agents of weaker alkaline reaction, for instance sodium carbonate, sodium sulphite, sodium sulphide or ammonia, they are stable at temperatures below 60–70° C.

The following examples illustrate the invention, the parts being by weight:

*Example 1*

100 parts of cotton yarn are impregnated for ½ hour in 2000 parts of a liquor consisting of 300 parts of sodium carbonate, 150 parts of sodium hydroxide and 1550 parts of water, then centrifuged and xanthated for 20–24 hours in excess carbon bisulphide while in gentle motion. The yarn freed from excess of sulphurising agent is now worked for 20–60 minutes in a solution of 200 parts of ammonium chloride in 2000 parts of water to which there are quickly added 200 parts of sodium hypochlorite solution containing 10 per cent of active chlorine and subsequently thoroughly rinsed and then immersed for a short time in water containing sodium bisulphite; rinsing and drying follow. The increase in weight of the goods averages 20 per cent and the fibre contains about 1.75 per cent of nitrogen and about 9 per cent of sulphur.

Instead of ammonium chloride, ammonium sulphate may be used and instead of sodium hypochlorite calcium hypochlorite.

*Example 2*

100 parts of cotton yarn are alkalised and xanthated in carbon bisulphide in a manner described in Example 1. The material thus prepared is immersed in 2000 parts of an aqueous solution of 2–3 per cent strength of ammonia which has been previously mixed with 200 parts of sodium hypochlorite solution containing 13.5 per cent of active chlorine. After ½ hour the yarn is rinsed, soured, again rinsed and dried.

Before it is treated with the ammoniacal solution the yarn may be passed through a saturated aqueous solution of sodium sulphate. Thus a similar result is obtained.

Instead of a dilute ammoniacal solution there may be used a more concentrated aqueous solution of ammonia, for example of 15–25 per cent strength.

*Example 3*

A cotton yarn which has been treated as described in Example 1 or 2 is introduced into a bath at 40–50° C. containing 4 per cent of Chrome Fast Orange R (Colour Index No. 274) or 8 per cent of Cloth Fast Black B (Colour Index No. 307) and 3 per cent of acetic acid of 40 per cent strength (all calculated on the weight of the fibre), the bath is raised to the boil and dyeing is continued for ¾ to 1 hour. In the case of the Chrome Fast Orange R the bath is now somewhat cooled and there is added 2 per cent of potassium chromate and after-chroming is produced by boiling for ½ hour. The baths are completely exhausted, the dyeings have great fastness to water and washing.

*Example 4*

A viscose spinning mass containing 8 per cent of cellulose is introduced from a film casting machine into a bath consisting of an aqueous solution of 40–65 per cent strength of ammonium sulphate. Already at room temperature but considerably more quickly at 60° C. the cellulose xanthate coagulates to the form of a film. This is now passed into a second bath consisting of dilute aqueous sodium hypochlorite solution containing for example 3 grams of active chlorine per litre, wherein the change to the water insoluble cellulose derivative containing sulphur and nitrogen proceeds. There follows a further bath consisting of sulphuric acid of 5 per cent strength, wherein the film is soured. Generally the film becomes turbid, but this turbidity quickly disappears. After thorough rinsing in flowing water the film may be after-treated in an aqueous solution of 1 per cent strength of glycerine, whereby the product attains a more flexible form. The film is then dried in the usual manner.

*Example 5*

A viscose spinning mass having a cellulose content of 8 per cent and an ammonium chloride number of 9–12 (compare Hottenroth; Die Kunstseide, 2nd edition, 1930, pages 307/08) is spun in a precipitating bath consisting of an aqueous solution of 40 per cent strength of ammonium sulphate at 25–40° C., the length of the filament in the bath being 15 cm. and the draught being 60 metres per minute. The bundle of fibres thus obtained is drawn from the galettes and treated at a liquor ratio of about 1:25 in a bath containing 8–10 grams of active chlorine (in the form of sodium hypochlorite) and 2 grams of sodium hydroxide per litre until the change to the cellulose derivative stable to water and containing sulphur and nitrogen has occurred. The fibre is then squeezed and soured in a bath of 5 per cent strength of sulphuric acid, then thoroughly rinsed and preferably de-sulphurized. The latter operation may consist in a short treatment (5 minutes) in an aqueous solution of 1 per cent strength of sodium sulphide at 40° C. or in an aqueous solution of 2 per cent strength of sodium sulphite at 50–60° C. for ½ hour. There follow further rinsing and drying. The fibre contains about 2 per cent of nitrogen and about 4.8 per cent of sulphur in chemical union. It has proved advantageous to use the precipitating bath in an acid form, for instance that in which viscose is spun under otherwise equal conditions, namely a solution containing 5 per cent of sulphuric acid in addition to 35–40 per cent of ammonium sulphate. However then the after-treatment in the sodium hypochlorite solution must follow immediately to avoid too profound a decomposition of the cellulose xanthate.

*Example 6*

A viscose spinning mass of composition similar to that used in Example 5 is spun in a precipitating bath containing 30 per cent of sodium sulphate and 10 per cent of acetic acid at a temperature of 60–70° C. The length of the filament in the bath is 20 cm. and the draught 70 metres per minute. The bundle of fibres obtained is introduced at a liquor ratio of 1:20 into a bath containing aqueous ammonia solution of 5 per cent strength and 10 grams of active chlorine (in the form of sodium hypochlorite) per litre in which it is handled for 15 minutes at the ordinary temperature. There follows a bath of dilute sulphuric acid, thorough rinsing and de-sulphurising as described in Example 5 after which the material is rinsed and dried. Instead of an ammonia solution of 5 per cent strength there may be used a dilute aqueous solution, for instance of 5–20 per cent strength of monomethylamine or monoethylamine.

*Example 7*

Artificial fibres obtained as described in Example 5 or 6 are dyed with acid dyestuffs, for example Naphthochrome Cyanine R (Colour Index, supplementary volume page 46) or Neolan Green BL conc. (Colour Index, supplementary volume page 46); deep fast tints are obtained.

What we claim is:

1. Process for the manufacture of cellulose derivatives containing sulphur and nitrogen, which comprises treating cellulose xanthate in solid form with a chlorinating agent and an aqueous solution of a nitrogenous compound of the general formula

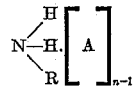

wherein R is a member of the group consisting of a hydrogen atom and an alkyl residue, A stands for an acid capable of forming a salt with

and $n$ is a positive integer not greater than 2.

2. Process for the manufacture of cellulose derivatives containing sulphur and nitrogen, which comprises treating cellulose xanthate in solid form with a chlorinating agent and an aqueous solution of a nitrogenous compound of the general formula

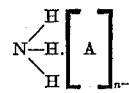

wherein A stands for an acid capable of forming a salt with

and $n$ is a positive integer not greater than 2.

3. Process for the manufacture of cellulose derivatives containing sulphur and nitrogen, which comprises treating cellulose xanthate in solid form with a chlorinating agent and an aqueous solution of ammonium sulphate.

4. Process for the manufacture of cellulose derivatives containing sulphur and nitrogen, which comprises treating cellulose xanthate in solid form with a chlorinating agent and an aqueous solution of ammonium chloride.

5. Process for the manufacture of cellulose derivatives containing sulphur and nitrogen, which comprises treating cellulose xanthate in solid form with a chlorinating agent and an aqueous solution of methylamine.

6. Process for the manufacture of cellulose derivatives containing sulphur and nitrogen, which comprises treating cellulose xanthate in solid form with a solution of sodium hypochlorite and of ammonium sulphate.

7. Process for the manufacture of cellulose derivatives containing sulphur and nitrogen, which comprises treating cellulose xanthate in solid form with a solution of sodium hypochlorite and of ammonium chloride.

8. Process for the manufacture of cellulose derivatives containing sulphur and nitrogen which comprises treating cellulose xanthate in solid form with a solution of sodium hypochlorite and of methylamine.

9. The compounds identical with those which are obtained by the process which comprises treating cellulose xanthate in solid form with a chlorinating agent and an aqueous solution of a nitrogenous compound of the general formula

wherein R is a member of the group consisting of a hydrogen atom and an alkyl residue, A stands for an acid capable of forming a salt with

and $n$ is a positive integer not greater than 2.

10. The compounds identical with those which are obtained by the process which comprises treating cellulose xanthate in solid form with a chlorinating agent and an aqueous solution of a nitrogenous compound of the general formula

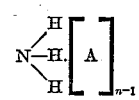

wherein A stands for an acid capable of forming a salt with

and $n$ is a positive integer not greater than 2.

11. The compounds identical with those which are obtained by the process which comprises treating cellulose xanthate in solid form with a chlorinating agent and an aqueous solution of ammonium sulphate.

12. The compounds identical with those which are obtained by the process which comprises treating cellulose xanthate in solid form with a chlorinating agent and an aqueous solution of ammonium chloride.

13. The compounds identical with those which are obtained by the process which comprises treating cellulose xanthate in solid form with a chlorinating agent and an aqueous solution of methylamine.

14. The compounds identical with those which are obtained by the process which comprises treating cellulose xanthate in solid form with a solution of sodium hypochlorite and of ammonium sulphate.

15. The compounds identical with those which are obtained by the process which comprises treating cellulose xanthate in solid form with a solution of sodium hypochlorite and of ammonium chloride.

16. The compounds identical with those which are obtained by the process which comprises treating cellulose xanthate in solid form with a solution of sodium hypochlorite and of methylamine.

ROBERT HALLER.
ALPHONSE HECKENDORN.